United States Patent
Hamlin et al.

(10) Patent No.: US 11,347,862 B2
(45) Date of Patent: May 31, 2022

(54) CREDENTIAL MANAGEMENT FOR AN INFORMATION HANDLING SYSTEM

(71) Applicant: Dell Products L.P., Round Rock, TX (US)

(72) Inventors: Daniel Lawrence Hamlin, Round Rock, TX (US); Charles Delbert Robison, Jr., Buford, GA (US)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 16/738,465

(22) Filed: Jan. 9, 2020

(65) Prior Publication Data

US 2021/0216639 A1 Jul. 15, 2021

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *G06F 21/57* | (2013.01) |
| *G06F 21/60* | (2013.01) |
| *G06F 21/32* | (2013.01) |

(52) U.S. Cl.
CPC ............ *G06F 21/575* (2013.01); *G06F 21/32* (2013.01); *G06F 21/604* (2013.01)

(58) Field of Classification Search
CPC ...... G06F 21/575; G06F 21/32; G06F 21/604; G06F 21/31
See application file for complete search history.

(56) References Cited

U.S. PATENT DOCUMENTS

| | | | | |
|---|---|---|---|---|
| 2018/0149748 | A1* | 5/2018 | Yang | G06F 21/6218 |
| 2018/0285544 | A1* | 10/2018 | Chang | G06K 9/2018 |
| 2018/0309792 | A1* | 10/2018 | Obaidi | G06F 21/32 |
| 2018/0322269 | A1* | 11/2018 | Arora | G06F 3/04883 |
| 2019/0166128 | A1* | 5/2019 | Kurian | H04L 63/12 |

\* cited by examiner

*Primary Examiner* — Amie C. Lin
(74) *Attorney, Agent, or Firm* — Norton Rose Fulbright US LLP

(57) ABSTRACT

A credential management system for an information handling system dynamically determines an available set of authentication techniques based on a system configuration. The dynamic configuration may be based on devices connected to the information handling system, such as keyboard, fingerprint reader, and facial recognition. The dynamic configuration may also be based on a dynamic posture of the information handling system, such as whether a devices is in an open-lid, closed-lid, tent-shape, tablet-mode, or docked configuration.

20 Claims, 6 Drawing Sheets

| System Configuration | Detected Devices | Device manipulation | Preferred Credential Provider Tile | Available Credential Provider Tiles |
|---|---|---|---|---|
| Clamshell, no external display | • Fingerprint<br>• Camera | • Enable Fingerprint<br>• Enable Camera | Fingerprint | Fingerprint, Camera, PIN, Recovery |
| Clamshell no user present, external display, keyboard attached | • Int. Fingerprint<br>• Camera | • Disable Fingerprint<br>• Disable Camera | PIN | PIN, Recovery |
| Clamshell user present, external fingerprint | • Int. Fingerprint<br>• Camera<br>• Ext. Fingerprint | • Disable Int. Fingerprint<br>• Enable Ext. Fingerprint<br>• Enable Camera | Fingerprint | Fingerprint, Camera, PIN, Recovery |
| Lid Closed, external fingerprint, external camera | • Ext. Camera<br>• Internal Camera<br>• Int. Fingerprint<br>• Ext. Fingerprint | • Disable internal fingerprint<br>• Disable internal camera<br>• Enable external fingerprint<br>• Enable external camera | Camera | Fingerprint, Camera, PIN, Recovery |

FIG. 6

CREDENTIAL MANAGEMENT FOR AN INFORMATION HANDLING SYSTEM

FIELD OF THE DISCLOSURE

The instant disclosure relates to security systems for information handling systems. More specifically, portions of this disclosure relate to dynamic credential management for managing security on information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Not only are users are processing and storing more information, but the information being processed and stored is changing in nature to include confidential information. The presence of confidential information on information handling systems necessitates the use of security measures to protect the confidential information. The security measures, however, can decrease user productivity of an information handling system by requiring additional input from the user.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

The additional input from a user to comply with security restrictions can be reduced by dynamically configuring security settings on an information handling system to select one or more authentication techniques from among available authentication techniques based on a system configuration. The dynamic selection may reduce user time consumed in selecting an authentication technique when prompted for authentication before entering credentials corresponding to the authentication technique. Reducing the user time required to authenticate can improve user productivity by allowing the user to return to working on information with limited interruption from the authentication challenge. The increase in user productivity can be large when a user is prompted repeatedly for authentication challenges in response to requests to access information on the information handling system. For example, if a healthcare user is prompted to supply credentials to an authentication challenge each time the user accesses a patient record, the number of interruptions to productivity can be quite large. Dynamically configuring security settings on the information handling system each time the patient is prompted for credentials to select an appropriate authentication technique can provide the user with reduced interruption, particularly when the information handling system is capable of changing configurations between the authentication challenges.

In some embodiments, a dynamic posture of the information handling system can be determined to select authentication techniques available for a user. For example, an information handling system, such as a laptop, can have an open and closed state. When a user's credentials are requested to authenticate access to content on the information handling system, the laptop's physical posture of open or closed can be determined and used to select a technique for authenticating the user. The user may be prompted to provide facial recognition input when the laptop is open at the time of requesting the user's credentials, but the user may be prompted to provide a password when the laptop is closed at the time of requesting the user's credentials. The chosen authentication technique is thus dynamically selected based on the configuration of the information handling system, which can reduce user time taken to choose an authentication technique when certain authentication techniques are not available based on the physical posture configuration of the information handling system. The password authentication technique may be dynamically selected regardless of the presence of the facial recognition authentication technique when the laptop is closed by determining the facial recognition authentication technique is not compatible with the physical posture configuration of the information handling system.

In some embodiments, a determination of one or more authentication devices coupled to the information handling system may be used to dynamically configure security settings to select one or more authentication techniques from among available authentication techniques. For example, an information handling system, such as a laptop, may determine an external dock is coupled to the laptop to which a keyboard with a fingerprint reader is coupled. Based on the availability of the fingerprint reader and the context of the laptop being docked, the laptop may dynamically select fingerprint scanning as a default primary authentication technique when requesting credentials from the user to authenticate the user.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 6 is a table illustrating example dynamic security settings for an information handling system in different configurations according to some embodiments of the disclosure.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
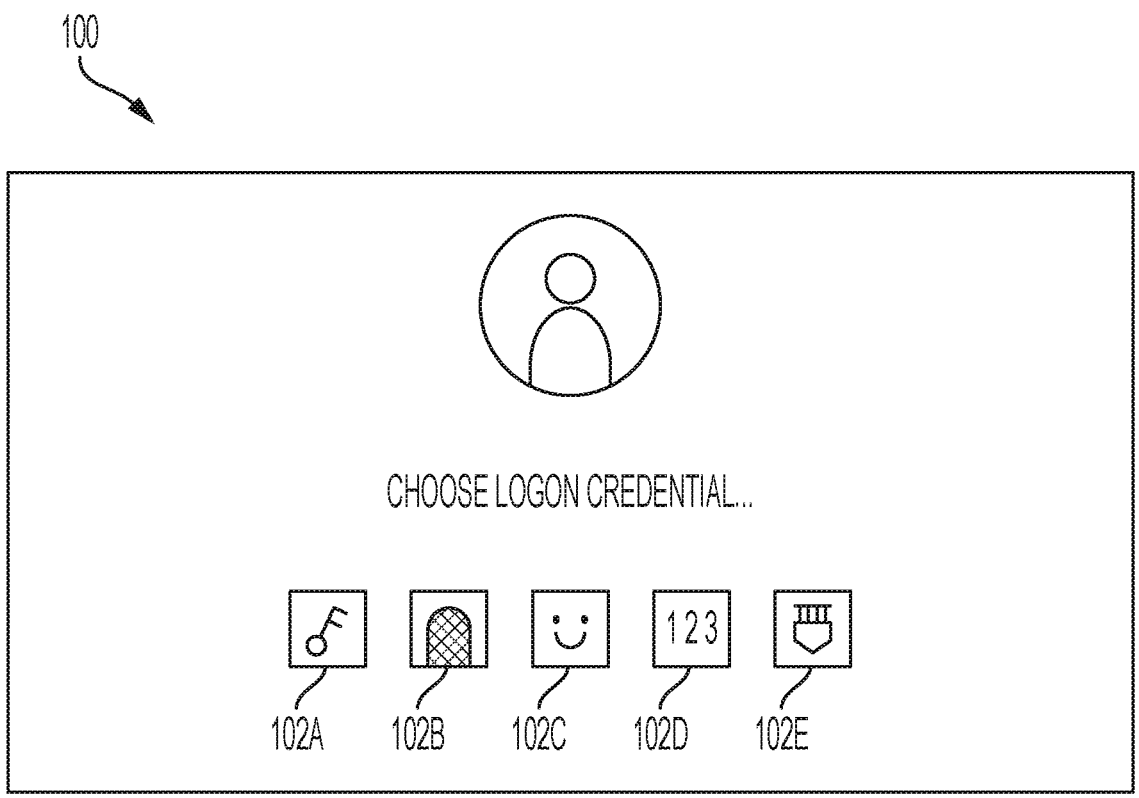
FIG. 1 is a screen shot illustrating logon options for a user according to the prior art.

Conventionally, complying with security FIG. 1 is a screen shot illustrating logon options for a user according to the prior art. A login screen 100 may be presented to a user when the information handling system is powered on. A set of tiles 102A-E is presented for different authentication techniques for a user to activate. A user taps on one of the tiles 102A-E and then enters the appropriate credentials for authentication. This process reduces user productivity because the tiles 102A-E may include authentication techniques not available to the user or inconvenient for the user to access based on the current system configuration. According to embodiments of this disclosure, the tiles 102A-E may be enabled or disabled based on the system configuration and/or one of the authentication techniques may be selected as a default technique.

Figure 2:
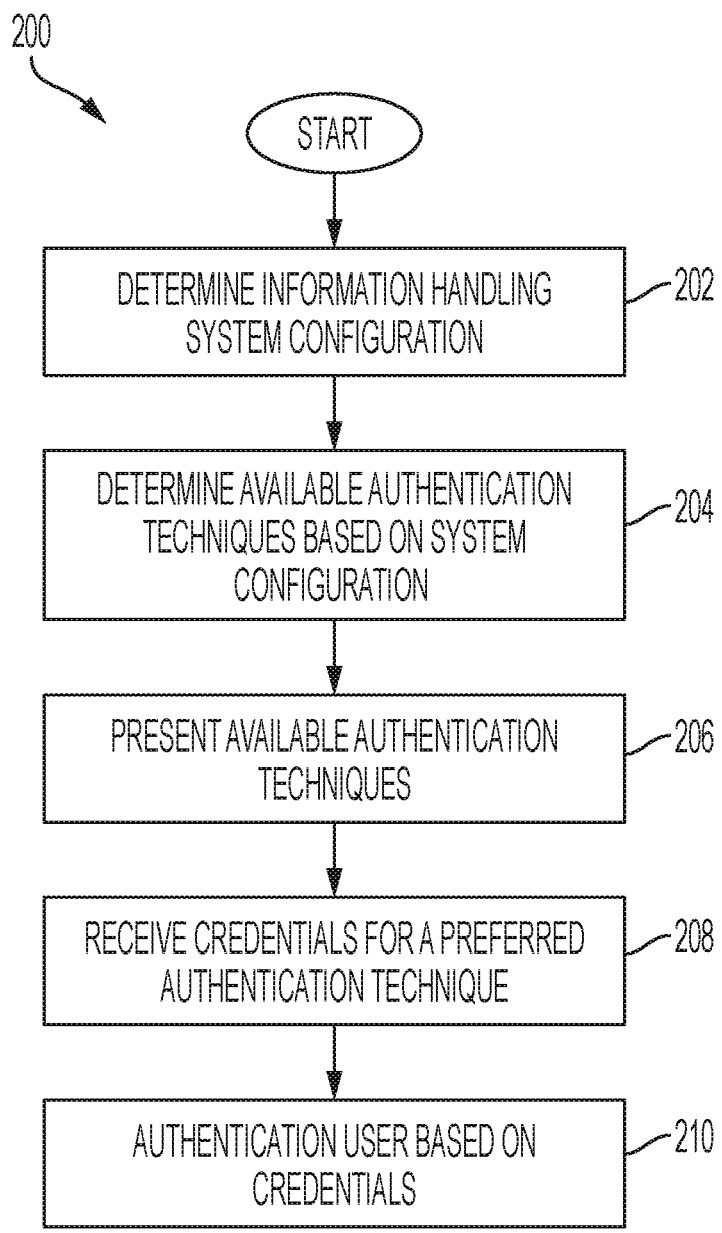
FIG. 2 is a flow chart illustrating a method of dynamically configuring security settings on an information handling system to select one or more authentication techniques from among available authentication techniques based on a system configuration according to some embodiments of the disclosure.

A flow chart for dynamically configuring authentication techniques based on system configuration is shown in FIG. 2. FIG. 2 is a flow chart illustrating a method of dynamically configuring security settings on an information handling system to select one or more authentication techniques from among available authentication techniques based on a system configuration according to some embodiments of the disclosure. A method 200 begins at block 202 with determining an information handling system configuration. In one example, the system configuration determined at block 202 may include a binary state of open or closed for a clamshell laptop, that binary state indicating whether the display screen is opened or closed. In another example, the system configuration determined at block 202 may include a list of connected accessories, such as whether an external keyboard is connected, whether an external fingerprint reader is connected, whether an external number pad is connected, whether an external camera is connected, whether the external camera has facial recognition features available, or whether a data port (such as a Universal Serial Bus (USB) port) is available. The system configuration may be determined, in part, by reading a device manager or other list of connected devices from the operating system. In some embodiments, determining the system configuration may include determining whether a pre-boot authentication, such as received by a basic input/output system (BIOS), was received prior to a bootloader loading an operating system.

The determination at block 202 may be executed at several times during operation of an information handling system. For example, the determination may be performed in response to the system resuming from a low-power state and/or receiving a request to initiate an authentication challenge for a user of the information handling system. As another example, the determination may be performed each time a user logs out or locks the information handling system. The securing of the system initiates a second authentication challenge for the user of the information handling system with causes the dynamic reconfiguration from a first set of available authentication techniques to a second set of available authentication techniques.

After the system configuration is determined, the information handling system determines available authentication techniques based on that system configuration at block 204. The determination of block 204 may include the application of a set of rules that determine the available techniques based on conditions within the configuration. Such a set of rules may be defined in an operating system or a separate application that manages the authentication procedure. An example rule may define that fingerprint authentication is available when a laptop lid is open and that fingerprint authentication is not available when the laptop lid is closed. Another example rule specifies that password authentication is available when a tablet is docked to a hub with attached keyboard and that password authentication is not available when a tablet is undocked from the hub. In some embodiments, the available authentication techniques may be filtered based on security policies defined by a user. For example, authentication techniques may be divided into high security techniques and low security techniques, and if any high security techniques exist among the available authentication techniques then the low security techniques may be disabled.

Figure 3:
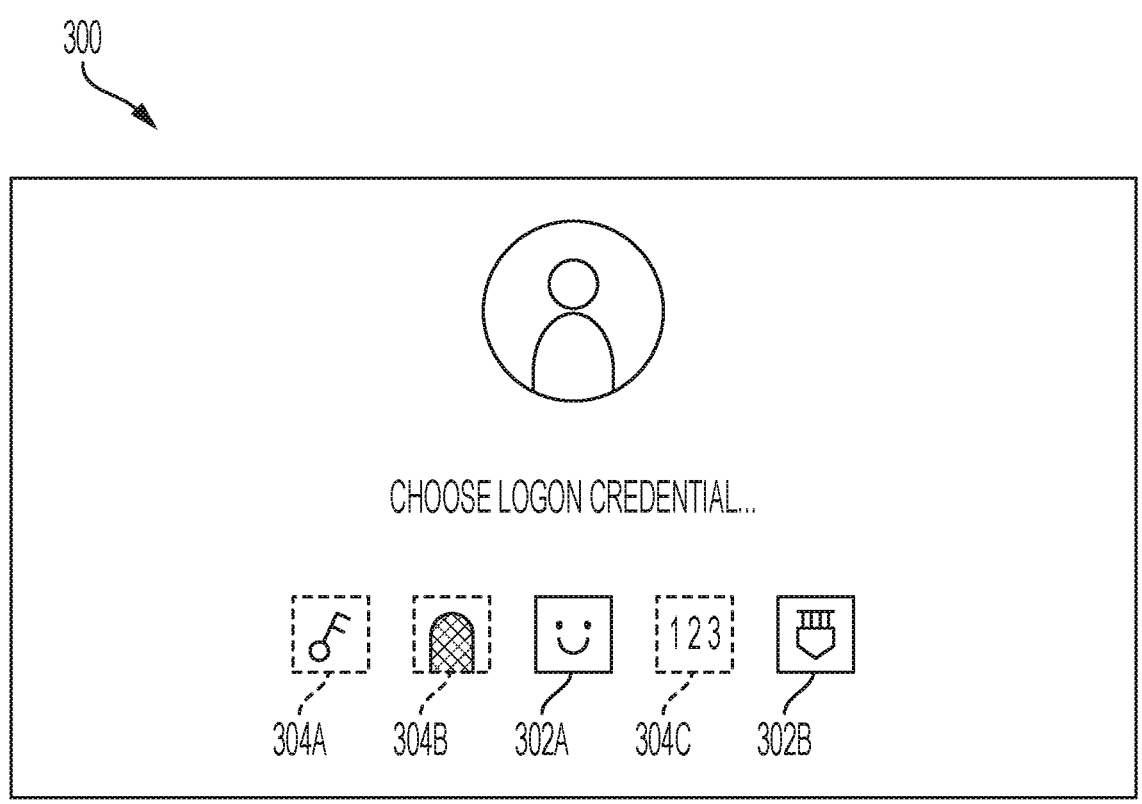
FIG. 3 is a screen shot illustrating logon options dynamically configured on an information handling system according to some embodiments of the disclosure.

After the available authentication techniques are determined from blocks 202 and 204, the user authentication may be performed. User authentication may begin by presenting the available authentication techniques to the user at block 206. FIG. 3 is a screen shot illustrating logon options dynamically configured on an information handling system according to some embodiments of the disclosure. A login screen 300 for a user may include tiles 302A-B indicating the available authentication techniques and tiles 304A-C indicating unavailable authentication techniques. The tiles 304A-C may be hidden from view by the user or may be greyed out or otherwise indicated as unavailable.

A preferred authentication technique may be determined as part of the determination of available authentication techniques at block 204. The preferred authentication technique may be an authentication technique selected from the available authentication techniques that allows a user to provide credentials without first selecting that particular available technique. In some embodiments, the preferred authentication technique may be selected by a user (such as a computer administrator) as the most secure of the available authentication techniques. For example, when the available authentication techniques are determined to be password, PIN, and fingerprint, a preferred authentication technique may be the fingerprint. In other embodiments, the preferred authentication technique may be a last-used authentication technique.

Returning to FIG. 2, a user at block 208 may be allowed to input their credentials to the preferred authentication technique without selection of a technique. For example, a fingerprint may be read from a fingerprint sensor without selecting the fingerprint option from the presented available authentication techniques at block 206. In some embodiments, a user may be allowed to enter credentials for any available authentication technique without first selecting a specific technique, regardless of any preference among the authentication techniques. The user is authenticated at block 210 based on the received credentials from block 208.

Figure 4A:
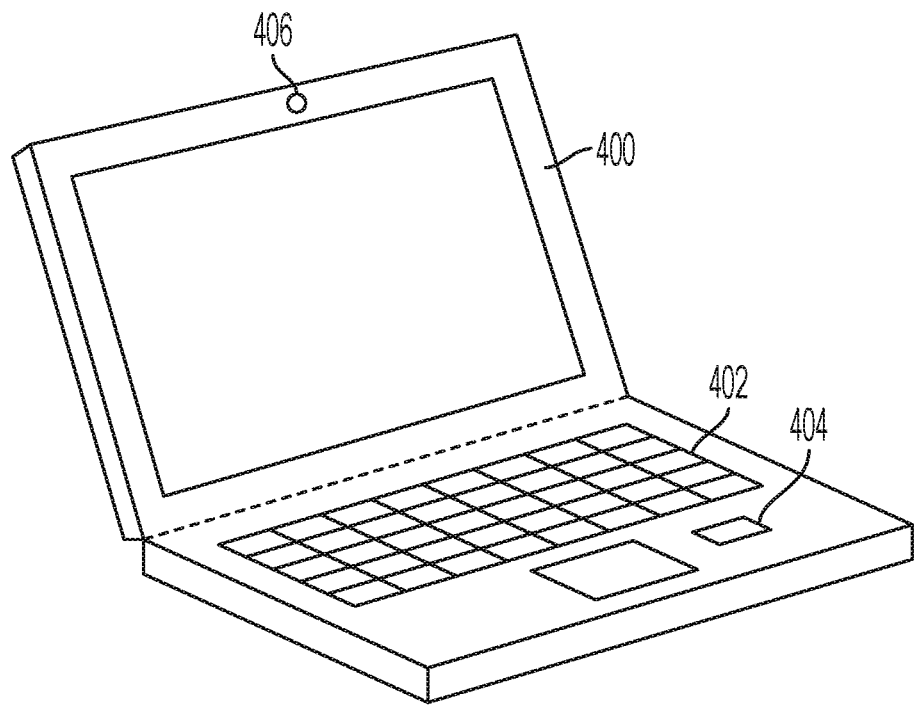
FIG. 4A is an illustration of an information handling system in one configuration according to some embodiments of the disclosure.
Figure 4B:
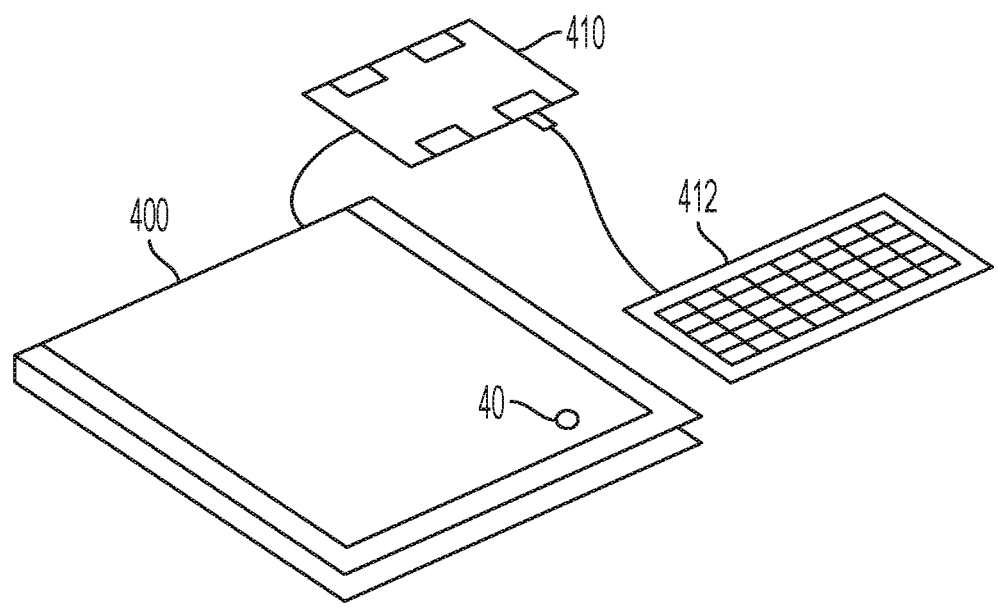
FIG. 4B is an illustration of an information handling system in another configuration according to some embodiments of the disclosure.

Example configurations for an information handling system is shown in FIG. 4A and FIG. 4B, and these configurations can affect the available authentication techniques. The examples of FIG. 4A and FIG. 4B show a clamshell laptop in different physical postures, which is a laptop computer with a lid that opens and closes. In an open state (FIG. 4A) the lid is up with the display and keyboard available to the user. In a closed state (FIG. 4B) the lid is down with the display and keyboard unavailable to the user. FIG. 4A is an illustration of an information handling system in one configuration according to some embodiments of the disclosure. In the open state, the information handling system 400 has a camera 406, a keyboard 402, and a fingerprint reader 404 available to the user. The dynamic posture of FIG. 4A may thus result in the availability of fingerprint, facial recognition, and password authentication techniques.

FIG. 4B is an illustration of an information handling system in another configuration according to some embodiments of the disclosure. In the closed state, the camera 406, the keyboard 402, and the fingerprint reader 404 of the information handling system 400 are no longer available to the user, although the devices remain electrically coupled and listed in the system's device manager. The dynamic posture of the system 400 can thus affect the available authentication techniques separately from a listing of devices coupled to the system 400. In FIG. 4B, the system 400 is coupled to a hub 410, which couples the system 400 to a keyboard 412. The configuration of the system 400 thus results in the availability of only the password authentication technique, despite the system 400 having an operable fingerprint scanner and camera capable of facial recognition. Although a rear camera 408 may be available in the dynamic posture of system 400, the rear camera 408 may not have capabilities for performing secure facial recognition as available with the camera 406. For example, the rear camera 408 may not have infrared dot visibility to prevent spoofing to gain false authentication. The dynamic posture of system 400 thus affects available authentication techniques to select a less secure authentication technique (e.g., password) over a more secure authentication technique (e.g., fingerprint).

Although a clamshell laptop is described in certain examples, the dynamic posture may include states other than open and closed. For example, a tablet may have dynamic posture states for docked to keyboard and not docked to keyboard. As another example, a 2-in-1 device may have dynamic states for laptop mode, tent mode, and tablet mode. Each of these system types and dynamic postures may result in different available authentication techniques.

Figure 5:
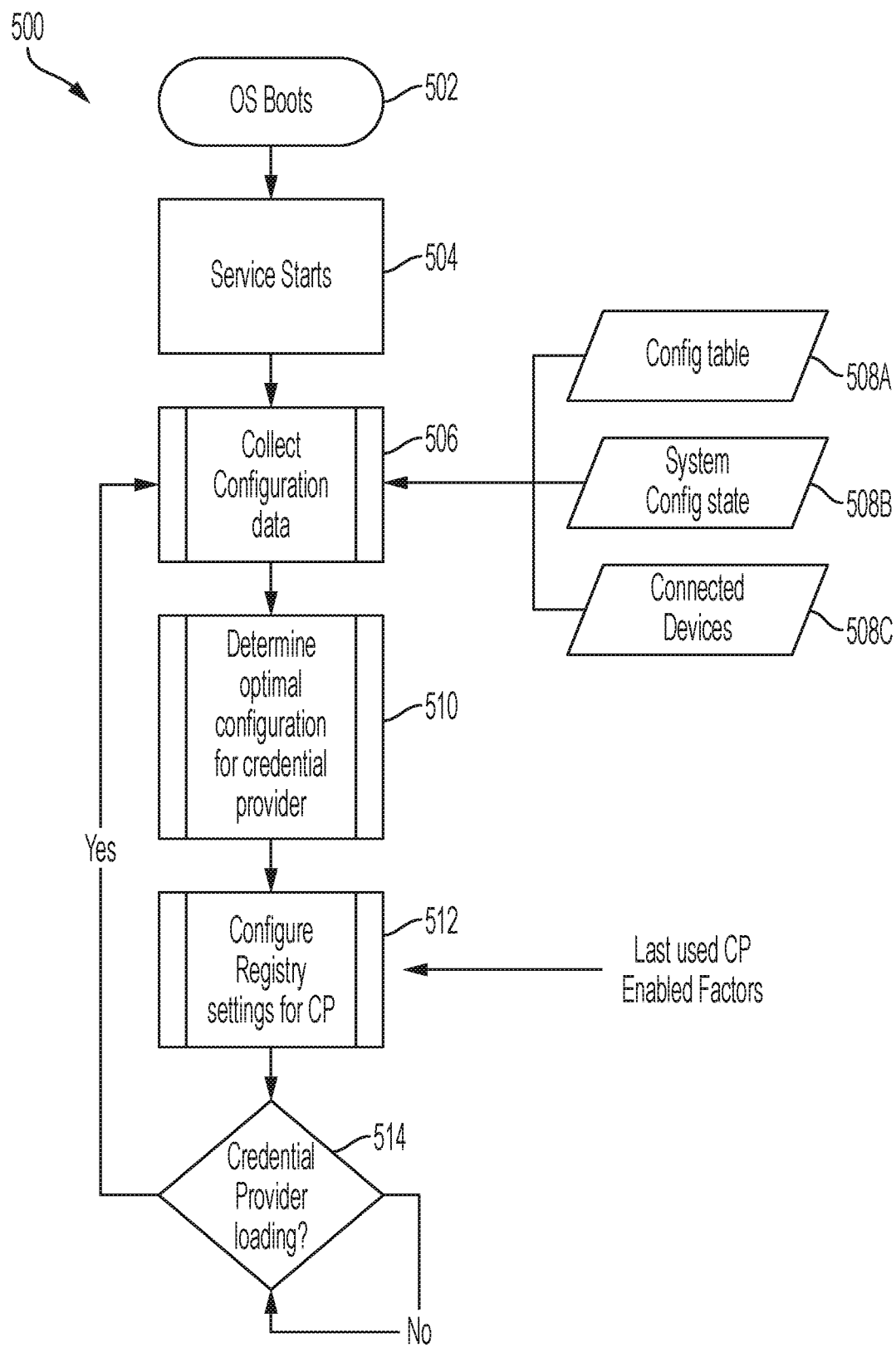
FIG. 5 is a flow chart illustrating a method of determining a credential provider configuration according to some embodiments of the disclosure.

One process for configuring an information handling system to perform user authentication is shown in FIG. 5. FIG. 5 is a flow chart illustrating a method of determining a credential provider configuration according to some embodiments of the disclosure. A method 500 begins at block 502 with an operating system booting on the information handling system. Then, at block 504, a service starts for handling user authentication. The service may be a background service executing in an operating system. The service may cause the execution of blocks 506, 510, and 512 each time the system resumes from a low-power state. At block 506, the service collects configuration data for the information handling system, including a configuration table 508A (such as a listing of devices available in each dynamic posture of the system), a system configuration state 508B (such as the system's dynamic posture determined by in-device sensors such as accelerometers and open/close sensors), and a list of connected devices 508C. Then, at block 510 a configuration is determined for the credential service started at block 504. The configuration at block 512 may include the available authentication techniques determined based on the configuration data of block 506. The configuration may be set in the credential service by modifying registry settings. The configuration may include a setting for a preferred authentication technique, which may be set to the last-used authentication technique.

An example set of rules for configuring authentication techniques on an information handling system based on system configuration is shown in FIG. 6. FIG. 6 is a table illustrating example dynamic security settings for an information handling system in different configurations according to some embodiments of the disclosure. Each row of the table is an example system configuration and a corresponding list of available authentication techniques and a preferred authentication technique. A column 602 indicates a system configuration that is determined at, for example, block 202 of FIG. 2. A column 604 indicates detected devices available on the system. A column 606 indicates the enabled devices that can be used to determine available authentication techniques and the disabled devices that cannot be used to determine available authentication techniques. A column 608 indicates a preferred authentication technique.

The schematic flow chart diagrams of FIG. 2 and FIG. 5 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   determining a system configuration of an information handling system, wherein the step of determining the system configuration comprises determining a physical posture of an arrangement of components of the information handling system;
   determining a set of available authentication techniques for the information handling system based on the determined system configuration;
   determining at least one preferred authentication technique from the set of available authentication techniques of the information handling system; and
   receiving, from a user of the information handling system, an authentication attempt corresponding to the at least one preferred authentication technique without receiving from the user a selection of an authentication technique.

2. The method of claim 1, further comprising receiving a request to initiate an authentication challenge for a user of the information handling system after resuming from a low-power state, wherein the determining the system configuration is performed based, at least in part, on the receiving of the request to initiate the authentication challenge.

3. The method of claim 2, further comprising: receiving a second request to initiate a second authentication challenge for the user of the information handling system; determining a second system configuration of the information handling system based, at least in part, on receiving the second request; and determining a second set of available authentication techniques for a user to respond to the second authentication challenge based on the second system configuration.

4. The method of claim 1, wherein the step of determining the system configuration further comprises determining one or more authentication devices coupled to the information handling system.

5. The method of claim 4, wherein the step of determining one or more authentication devices comprises determining a keyboard with a fingerprint reader is coupled to the information handling system, and the step of determining the set of available authentication techniques comprises determining fingerprint authentication is part of the set of available authentication techniques.

6. The method of claim 1, wherein the step of determining the system configuration comprises determining the information handling system is a laptop with a closed lid, and wherein determining the set of available authentication techniques comprises determining a facial recognition authentication technique is unavailable based on the system configuration having a closed lid.

7. The method of claim 1, wherein the step of determining the system configuration further comprises determining the information handling system received a pre-boot authentication for a user of the information handling system.

8. The method of claim 1, wherein the step of determining the preferred authentication technique comprises: retrieving a security policy for the information handling system, wherein the security policy specifies certain authentication techniques as the preferred authentication technique.

9. The method of claim 1, wherein the step of determining a set of available authentication techniques for the information handling system based on the determined system configuration comprises:
determining a plurality of authentication techniques of the information handling system; and
removing, based on the determined system configuration, at least one of the plurality of authentication techniques to obtain the set of available authentication techniques for the information handling system.

10. The method of claim 1, further comprising presenting to a user of the information handling system a user interface for selecting from the set of available authentication techniques for the information handling system based on the determined system configuration.

11. The information handling system of claim 1, wherein the processor is further configured to perform steps comprising presenting to a user of the information handling system a user interface for selecting from the set of available authentication techniques for the information handling system based on the determined system configuration.

12. An information handling system, comprising:
a memory; and
a processor coupled to the memory and configured to perform steps comprising:
determining a system configuration of the information handling system, wherein the step of determining the system configuration comprises determining a physical posture of an arrangement of components of the information handling system; and
determining a set of available authentication techniques for the information handling system based on the determined system configuration;
determining at least one preferred authentication technique from the set of available authentication techniques of the information handling system; and
receiving, from a user of the information handling system, an authentication attempt corresponding to the at least one preferred authentication technique without receiving from the user a selection of an authentication technique.

13. The information handling system of claim 12, wherein the processor is further configured to perform steps comprising: receiving a request to initiate an authentication challenge for a user of the information handling system after resuming from a low-power state, wherein the determining the system configuration is performed based, at least in part, on the receiving of the request to initiate the authentication challenge.

14. The information handling system of claim 12, wherein the step of determining the system configuration further comprises determining one or more authentication devices coupled to the information handling system.

15. The information handling system of claim 12, wherein the step of determining a set of available authentication techniques for the information handling system based on the determined system configuration comprises:
determining a plurality of authentication techniques of the information handling system; and
removing, based on the determined system configuration, at least one of the plurality of authentication techniques to obtain the set of available authentication techniques for the information handling system.

16. A computer software product, comprising:
a non-transitory computer readable medium comprising code that when executed by a processor causes the processor to perform steps comprising:
determining a system configuration of an information handling system, wherein the step of determining the system configuration comprises determining a physical posture of an arrangement of components of the information handling system; and
determining a set of available authentication techniques for the information handling system based on the determined system configuration;
determining at least one preferred authentication technique from the set of available authentication techniques of the information handling system; and
receiving, from a user of the information handling system, an authentication attempt corresponding to the at least one preferred authentication technique without receiving from the user a selection of an authentication technique.

17. The computer software product of claim 16, wherein the medium further comprises code that when executed by the processor causes the processor to perform steps comprising: receiving a request to initiate an authentication challenge for a user of the information handling system after resuming from a low-power state, wherein the determining the system configuration is performed based, at least in part, on the receiving of the request to initiate the authentication challenge.

18. The computer software product of claim 16, wherein the step of determining the system configuration further comprises determining one or more authentication devices coupled to the information handling system.

19. The computer software product of claim 16, wherein the step of determining a set of available authentication techniques for the information handling system based on the determined system configuration comprises:
determining a plurality of authentication techniques of the information handling system; and
removing, based on the determined system configuration, at least one of the plurality of authentication techniques to obtain the set of available authentication techniques for the information handling system.

20. The computer software product of claim 16, wherein the code, when executed by the processor, causes the processor to perform steps further comprising presenting to a user of the information handling system a user interface for selecting from the set of available authentication techniques for the information handling system based on the determined system configuration.

* * * * *